United States Patent [19]

Litvinov et al.

[11] 4,162,921
[45] Jul. 31, 1979

[54] GLASS-CRYSTALLINE MATERIAL AND METHOD OF PRODUCING SAME

[76] Inventors: Pavel I. Litvinov, Novorogozhskaya ulitsa, 11, korpus 2, kv. 25; Vitaly M. Firsov, 9 Parkovaya ulitsa, 8, kv. 25; Galina B. Knyazher, ulitsa Klimashkina, 21, kv. 28, all of Moscow, U.S.S.R.

[21] Appl. No.: 756,988

[22] Filed: Jan. 5, 1977

[51] Int. Cl.$^2$ .................... C03C 3/22; C03B 32/00
[52] U.S. Cl. .................................... 106/39.8; 65/33
[58] Field of Search ........................ 65/33; 106/39.8

[56] References Cited

U.S. PATENT DOCUMENTS

| | | | |
|---|---|---|---|
| 3,490,888 | 11/1970 | Strong | 106/39.8 X |
| 3,785,834 | 1/1974 | Rapp | 65/33 X |
| 3,819,387 | 6/1974 | Leger et al. | 106/39.8 X |
| 3,899,340 | 8/1975 | Walmendyer | 106/39.8 X |
| 3,951,670 | 4/1976 | Bush | 65/33 X |
| 4,030,903 | 6/1977 | Rittler | 65/33 X |
| 4,047,960 | 9/1977 | Reade | 65/33 X |

OTHER PUBLICATIONS

Journal of Materials (1973), pp. 1 to 11, Crystallization and Structure of a MgO—Al$_2$O$_3$—SiO$_2$—TiO$_2$ Glass Ceramic by W. Zdaniewski.
Glass–Ceramic and Photo Sitalls by Anotolii I. Berezhitoi—Plenum Press 1970, pp. 212 to 214.
ATM-Card-Davey-Kwick (Alphabetical Chemical Name) Index by Johnson and Wand, from Research Lab. of Penn. State University.
Bogdanuva, G. S. et al., (in Russian) Neorg. Mater. AN SSSR Publishers, v. VI, No. 5, 1970.

*Primary Examiner*—Arthur D. Kellogg
*Assistant Examiner*—Frank W. Miga
*Attorney, Agent, or Firm*—Robert E. Burns; Emmanuel J. Lobato; Bruce L. Adams

[57] ABSTRACT

Glass-crystalline material has dielectric properties close those of alumina ceramics (dielectric constant is 10 and dielectric loss factor (3-5) 0.10$^{-4}$ at a frequency of 10$^{10}$ Hz). The material contains, for example, the following ingredient in weight percent:

SiO$_2$—31—45;
Al$_2$O$_3$—20—30;
MgO—5—15;
TiO$_2$—15—25;
CeO$_2$—7.0—8.5;
La$_2$O$_3$—3.0—4.6, and other oxides of rare earth elements in addition to the mentioned above — 3.0-4.6.

When producing the material, the initial glass is heated at a rate of 60°–300°/hr up to 1,200° C. and held for 3–6 hours at this temperature while crystallization proceeds.

8 Claims, No Drawings

GLASS-CRYSTALLINE MATERIAL AND METHOD OF PRODUCING SAME

FIELD OF THE INVENTION

The present invention relates to technology of producing glass-crystalline materials, (sitall) (glass-ceramics) particularly, materials to be used in electronics, for example, as substrates for microwave integrated circuits in super-high frequency equipment.

BACKGROUND OF THE INVENTION

Improvements and microminiaturization of electronic equipment call for materials with increased dielectric constant ($\epsilon$) of the order of 10 and of low loss angle at a frequency of $10^{10}$ Hz.

Glass crystalline material of the composition $SiO_2$, $Al_2O_3$, MgO, $TiO_2$ with a low loss angle is known in the art. However, the dielectric constant of the known material is also small (5.5-7.5) because of the fact that titanium dioxide is precipitated not in the form of rutile ($\epsilon \sim 80$-100) but, mainly, in solid solutions of magnesium and aluminum titanates.

Glass crystalline material containing $SiO_2$, $Al_2O_3$, $Ca_2O$, MgO and $TiO_2$ is used as a basis for thin-film microcircuits in electronic equipment but this material cannot be used in the microwave range where losses are too high (40-45·$10^{-4}$).

Also known in the art are materials based on alumina ceramics (with $Al_2O_3$ content equal to 96-99.5%) which are used for the above-cited purposes since they possess high enough dielectric constant in combination with low loss level. However, substrates made of these materials having a high grade of surface finish (surface roughness 0.05$\mu$) are rather expensive. Their cost is 5-6 times as high as that of similar items made of glass crystalline materials.

A method of producing glass crystalline material is known, wherein the initial glass is heated to maximum crystallization temperature and held at this temperature, but the rates of heating and maximum temperatures are different for various materials.

THE INVENTION

It is an object of the invention to provide a glass crystalline material which will have dielectric constant equal to 10 and a low level of dielectric losses in the microwave region.

It is also an object of the invention to provide a material which can be used as the bases or supports for integrated circuits in microwave equipment.

A further object of the invention is to provide a material whose application in microwave equipment instead of alumina ceramic will be of great economic efficiency.

Another object of the invention is to provide a method of producing glass crystalline material which will ensure the precipitation of the corresponding composition of crystalline phases and the formation of finely dispersed structure (crystal size less than 1$\mu$) in suitable quality and quantity.

Said and other objects of the invention are accomplished by the provision of glass crystalline material, with dielectric properties close to those of alumina ceramics (dielectric constant of 10 and dielectric loss factor of 3-5·$10^{-4}$ at a frequency of $10^{10}$ Hz), containing $SiO_2$, $Al_2O_3$, MgO, and $TiO_2$ and, characterized in that it also contains oxides of rare earth elements selected from the group consisting of $CeO_2$, $La_2O_3$, $Pr_2O_3$, and $Nd_2O_3$, said oxides of the rare earth elements being present in combined amounts from 14.0 to 17.0 weight percent.

Such a composition when crystallized provides a glass crystalline material with a higher dielectric constant as compared to that of the materials containing similar ingredients but without the addition of the rare earth oxides. The higher value of dielectric constant is due to the fact that the addition of rare earth oxides inhibit the formation of magnesium aluminotitanate yielding and promote formation of a perrierite. Residual titanium dioxide is crystallized in the form of rutile.

According to another embodiment of the present invention, a glass crystalline material is proposed, characterized in that it has the following composition in weight percent: $SiO_2$—31-45; $Al_2O_3$—20-30; MgO—5-15; $TiO_2$—15-25; $CeO_2$—7.0-8.5; $La_2O_3$—3.0-4.6; and other oxides of rare earth elements besides those mentioned above—3.0-4.6.

Such a composition provides a glass crystalline material with dielectric constant equal to 10 and dielectric loss factor 3-5·$10^{-4}$ at a frequency of $10^{10}$ Hz.

Introduction of the oxides of lanthanum and of the other rare earths into the glass composition improves the technological properties of the initial glass since it becomes more transparent, which makes it possible to control the quality of intermediate products at the stage of shaping and, consequently, to reduce rejects.

According to the third embodiment of the present invention, a glass crystalline material is proposed, characterized in that as the above-mentioned other oxides use is made of neodymium oxide $Nd_2O_3$ in combination with praseodymium oxide ($Pr_2O_3$) taken in amounts of 3.0-4.6 weight percent.

In this case economic efficiency is attained by the use of raw material containing various oxides of rare earths in an approximate ratio: $CeO_2:La_2O:Nd_2O_3:Pr_2O_3 = 1:0.5:0.25:(0.25-0.12)$.

According to the fourth embodiment of the present invention, a method is proposed of producing glass crystalline material, residing in that the initial glass of stated composition is heated to the maximum crystallization temperature and held at this heat treatment temperature; the method is characterized in that heating is performed at a rate of 60°-300° C./hr up to 1,200° C. and exposure at this temperature lasts for 3-6 hours.

This embodiment makes it possible to obtain material with the desired electrical properties, caused by the separation of the crystalline phases and by dispersion of the structure as determined from X-ray phase analysis and by the type of the material fracture.

For a better understanding of the present invention specific examples of its realization are given hereinbelow by way of illustration.

Sitall (glass crystalline material) is obtained in the following way.

Glass of the initial composition is melted in furnaces with a capacity 1.5-5.0 tons at a maximum temperature 1,520°-1,550° C., use is made of technical-grade materials ensuring that the total content of alkaline oxide impurities be no more than 0.1%. The oxides of the rare earth elements are introduced either separately or with the raw material containing these oxides in said ratio. The blanks of the substrates are shaped from the resulting glass manually or on a horizontal rolling apparatus with stream feeding.

Crystallization is conducted in continuous furnaces at a maximum temperature 1200° C. at a rate of moving the blanks equal to 200 mm/hr. The sitall obtained has the following properties (Table).

TABLE

| Property | Numeric Value |
| --- | --- |
| Dielectric constant $\epsilon$, $t=20°$ C., $f=10^{10}$ Hz | 10 |
| Dielectric loss factor tan.ty$\delta$.$10^4$, $t=20°$ C., $f=10^{10}$ Hz | 3–5 |
| Ultimate strength upon control symmetrical bending, kg/mm$^2$ | 25 |
| Thermal expansion coefficient, (20–300° C.), 1/°C. | $32.0.10^{-7}$ |
| Volume resistivity, $\rho$ at 100° C., Ohm.cm | $10^{12}$ |
| Water absorption, % | 0 |

Phase composition of the sitall is represented by cordierite, rutile, and by a compound similar in structure to perrierite. In this compound all rare earth elements replace one another isomorphically. The crystal size is less than 1$\mu$.

Particular compositions of sitalls are given below (in weight percent):

|  | No.1 | No.2 | No.3 | No. 4 |
| --- | --- | --- | --- | --- |
| SiO$_2$ | 33.0 | 31.6 | 44.5 | 33.0 |
| Al$_2$O$_3$ | 23.0 | 29.3 | 16.0 | 23.0 |
| MgO | 9.0 | 5.7 | 6.0 | 9.0 |
| TiO$_2$ | 18.0 | 16.7 | 16.8 | 18.0 |
| CeO$_2$ | 8.5 | 8.3 | 8.3 | 8.5 |
| La$_2$O$_3$ | 4.1 | 4.1 | 4.1 | 8.5 |
| Pr$_2$O$_3$ | 2.2 | 2.2 | 2.2 | — |
| Nd$_2$O$_3$ | 2.2 | 2.1 | 2.1 | — |

Permissible deviations of the content of each oxide, except magnesium oxide, must not exceed ±0.5%; deviation of MgO contents must not exceed 0.3%.

A change in the content of SiO$_2$, Al$_2$O$_3$, and MgO alters the amount of cordierite; therefore, an increase in these oxides above the given limits causes a fall of dielectric constant ($\epsilon$), whereas a decrease in their content increases $\epsilon$ against the rated value.

Variation of the content of rare earth elements from the given values alters the amounts of the compounds with perrierite and rutile structure and, consequently, increases or decreases $\epsilon$. Sitall articles, obtained from glass whose composition is within the above-cited range and crystallized in accordance with the conditions described, are colored light yellow; the absence of yellow shade or presence of very dark color in the samples are indicative of improper heat treatment: underburning in the first case and overburning in the second.

Heat treatment conditions are controlled visually by a change in the color against a reference one and from time to time by X-ray phase analysis.

The herein-proposed glass crystalline material is highly uniform: variations of $\epsilon$ over the area, e.g. a substrate 60×48 or 150×48 mm is size, do not exceed 0.5%.

Substrates are easily treated and polished (surface roughness down to 0.05$\mu$), are readily perforated by various methods, including ultrasonic, and can be metallized both by firing-in and by vacuum deposition.

They are used as components of microwave units which are employed in various types of radio communication (couplers, multi-channel power dividers, etc.).

What we claim is:

1. A glass-crystalline material consisting essentially of silica, in an amount of 31 to 45% by weight, alumina in an amount of 20 to 30% by weight, magnesia in an amount of 5 to 15% by weight, titania in an amount of 15 to 25% by weight and 14 to 17 wt % of the oxides of the rare earth elements selected from group consisting of cerium, lanthanum, praseodyminum and neodymium; having crystalline phases of cordierite, rutile and a compound of perrierite-like structure and having dielectric properties including a dielectric constant, $\epsilon = 10$, and a dielectric loss factor tan $\delta = 3-5 \times 10^{-4}$ Hz.

2. The glass-crystalline material according to claim 1 consisting essentially of

|  | in Wt %: |
| --- | --- |
| SiO$_2$ | 31–45 |
| Al$_2$O$_3$ | 20–30 |
| MgO | 5–15 |
| TiO$_2$ | 15–25 |
| CeO$_2$ | 7–8.5 |
| La$_2$O$_3$ | 3–4.6 |
| other rare earth oxides to a total | 3–4.6 | and containing less than 0.1% alkali oxide.

3. The glass-crystalline material according to claim 2 wherein said other rare earth oxides is neodymium oxide (Nd$_2$O$_3$) and said rare earth elements in the perrierite-like compound replace one another isomorphically.

4. A thermally crystallized glass as claimed in claim 1, wherein Pr$_2$O$_3$ and Nd$_2$O$_3$ are present in said glass.

5. A thermally crystallized glass as claimed in claim 1, wherein said rare earth oxides are present in the following approximate ratios by weight, CeO$_2$:La$_2$O:Nd$_2$O$_3$:Pr$_2$O$_3$ = 1:0.5:0.25:(0.25–0.12).

6. An article made of a glass crystalline material defined in claim 1, resembling that of the mineral perrierite, and having a rutile and cordierite crystalline phase structure with a grain size of less than one micron.

7. A process for the production of the glass-crystalline material for dielectric substrates which comprises the steps of forming a glass melt composed of silica, alumina, magnesia and titania and 14 to 17 wt % of the oxides of the rare earth elements selected from group consisting of cerium, lathanum, praseodymium and neodymium; forming shaped articles of said glass; heating said glass articles to the maximum crystallization temperature for said glass composition at a rate of 60°–300° C. per hour and then holding said articles at said maximum crystallization temperature for a period of 3 to 6 hours to develop dielectric properties including a dielectric constant, $\epsilon = 10$, and a dielectric loss factor tan $3-5 \times 10^{-4}$ at $10^{10}$ Hz and crystalline phases of cordierite, rutile and a compound of perrierite-like structure.

8. The process according to claim 7 wherein said maximum crystallization temperature is substantially 1200° C.

* * * * *